Oct. 28, 1941.          S. DEUTSCHER          2,260,832
                  MACHINE FOR MAKING SANDWICHES
                    Filed Feb. 6, 1941          3 Sheets-Sheet 1
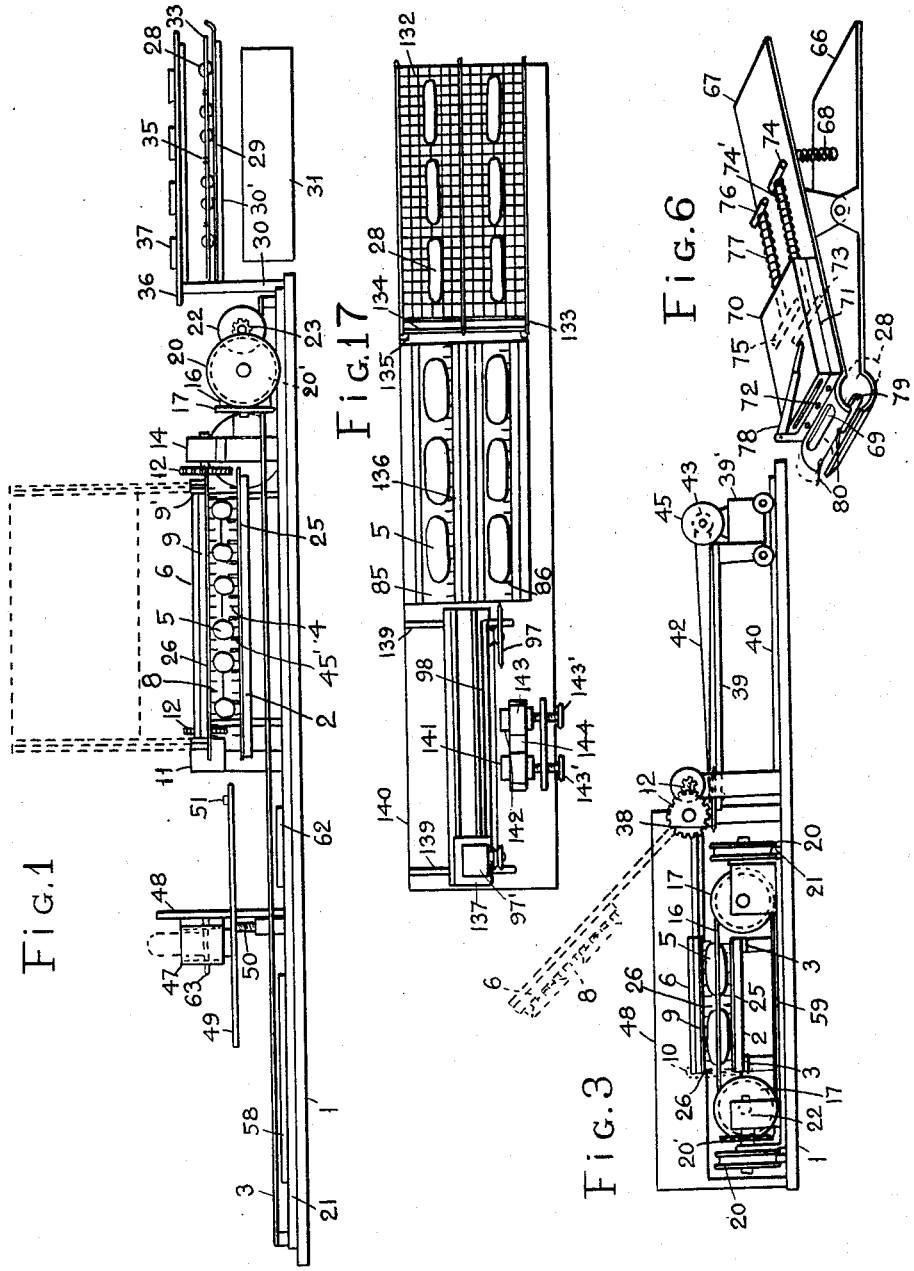
SAMUEL DEUTSCHER
        INVENTOR.
BY  John P. Wiranow
          ATTORNEY Oct. 28, 1941.   S. DEUTSCHER   2,260,832
MACHINE FOR MAKING SANDWICHES
Filed Feb. 6, 1941   3 Sheets-Sheet 2
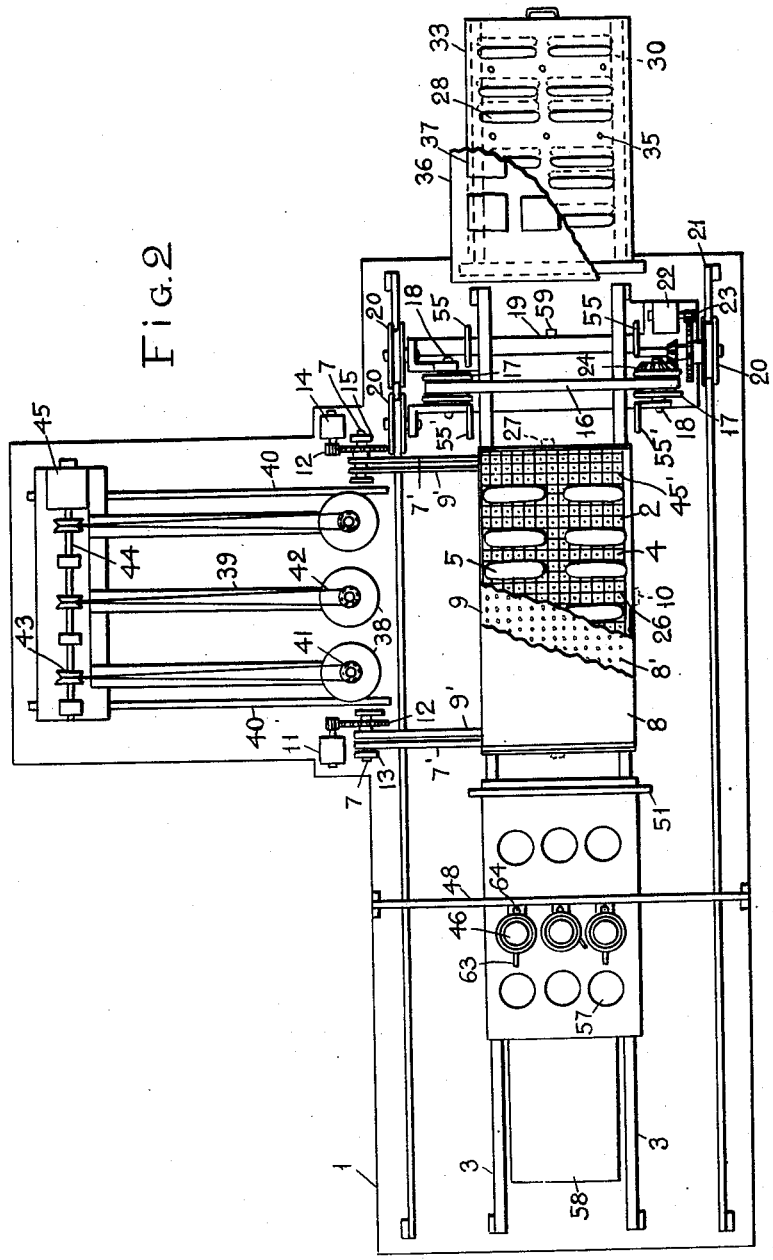
SAMUEL DEUTSCHER
INVENTOR.
BY John P. Mironow
ATTORNEY Oct. 28, 1941.  S. DEUTSCHER  2,260,832
MACHINE FOR MAKING SANDWICHES
Filed Feb. 6, 1941  3 Sheets-Sheet 3
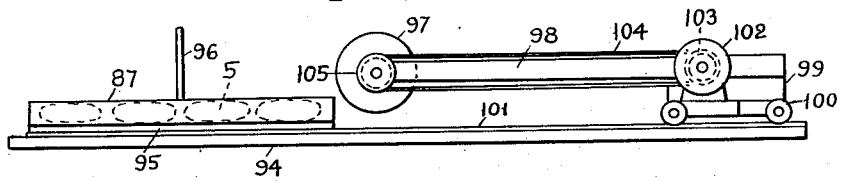
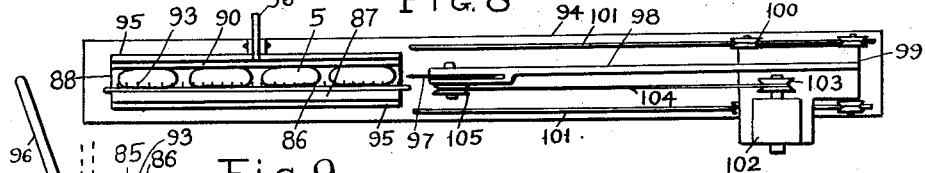
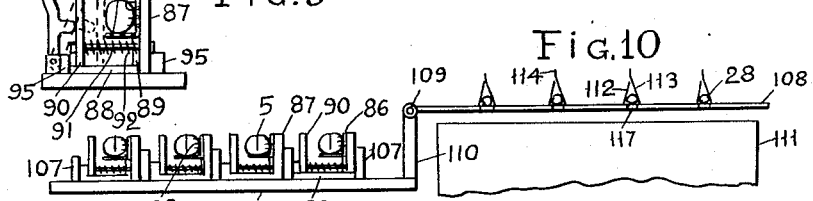
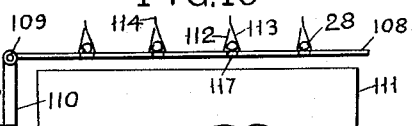
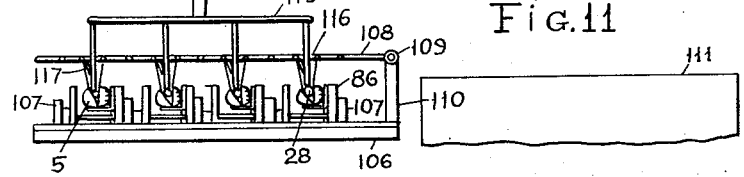
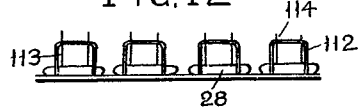
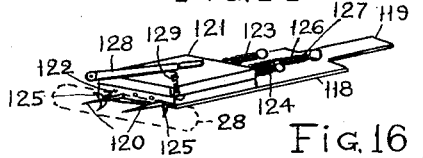
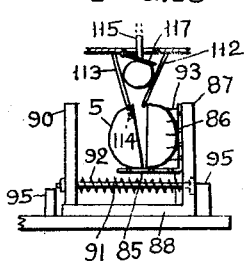
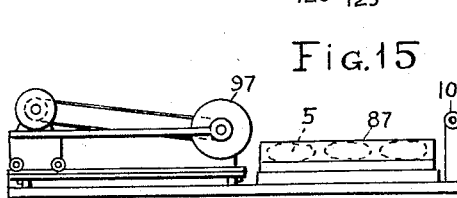
SAMUEL DEUTSCHER
INVENTOR.
BY John P. Nixonow
ATTORNEY Patented Oct. 28, 1941

2,260,832

UNITED STATES PATENT OFFICE 2,260,832

MACHINE FOR MAKING SANDWICHES

Samuel Deutscher, Brooklyn, N. Y.

Application February 6, 1941, Serial No. 377,650

5 Claims. (Cl. 107—1)

My invention relates to machines for making sandwiches and has particular reference to machines for making sandwiches on bread rolls.

My invention has for its object to provide a machine in which a number of bread rolls can be cut or split at the same time, the rolls being held between boards with sharp-pointed projections. After cutting the rolls by a movable knife, the roll portions are simultaneously separated for placing food portions on the lower roll portions.

Another object of my invention is to provide means to remove the complete sandwiches from the sharp-pointed projections on the boards. I provide for this purpose bars or grids placed on the boards between the projections and adapted to be held together, thereby clamping the upper roll portions against the lower portions, thereby permitting the removal of the sandwiches from the boards when the upper board is raised.

Another object of my invention is to provide means to roast or preheat food portions, such as sausages, frankfurters, etc., at the side of the board.

Another object of my invention is to provide means to cut slices of food articles by the same knife which cuts the bread rolls. I provide for this purpose brackets and holders for the food articles, such as sausage, cheese, etc., at the end of the table, an arrangement being provided to regulate the thickness of the slices and for removal of the slices on a supporting board.

Still another object of my invention is to provide means to undercut the rolls when desired, for which purpose I employ rotary knives, movable at the sides of the rolls. I also provide means to open the undercut rolls and to insert food articles between the opened halves of the rolls.

My invention is more fully described in the accompanying specification and drawings, in which:

Fig. 1 is an elevational view of my machine partly in section;

Fig. 2 is a top plan view partly in section;

Fig. 3 is an end view partly in section;

Figs. 4 and 5 are detail views of a food slicing mechanism;

Fig. 6 is a perspective view of a sausage delivering device;

Fig. 7 is an elevational view partly in section of a modified device for cutting bread rolls;

Fig. 8 is a top plan view of the same;

Fig. 9 is an enlarged end view of the same;

Fig. 10 is an elevational view of a modified sandwich making machine employing the device shown in Fig. 7;

Fig. 11 is a similar view of the same showing sausages being placed into the bread rolls;

Fig. 12 is an end view of the sausage supporting plate for the device shown in Fig. 10;

Fig. 13 is an enlarged end view of a modified machine;

Fig. 14 is a perspective view of a modified device for handling frankfurters;

Fig. 15 is a detail view of a grid with a sandwich;

Figs. 16 and 17 are elevational views of modified machines.

My machine for making sandwiches consists of a base 1 on which a lower board 2 is supported on bars 3 mounted on legs 3'. Sharp pins or projections 4 are provided on the board for holding bread rolls 5. An upper board 6 is hingedly supported at 7 on arms 7' and is also provided with sharp pins or projections 8 engaging the upper sides of the rolls when the upper board is pressed against them, as shown in Figs. 1 and 3. A second upper board 9 is also hinged at 7 on bars 9' and is provided with holes 8' for the pins 8. The pins extend beyond the second board, the latter being used when it is not desired to impale the rolls on the pins 8, the upper board being then raised.

An electric motor 11 may be provided for lowering the board 6, the motor being connected to the board by gears 12. Clock springs 13 tend to raise the board. Another motor 14 is used for raising the second board 9 against the tension of its springs 15. The motor, however, may be omitted if it is desired to lower the board by hand. Clamps 10 may be used for holding the boards in the lowered position.

For cutting or splitting the rolls, a knife is provided in the form of an endless blade 16 mounted on pulleys 17, the upper portion of the blade passing at the level of the rolls as shown, the lower portion passing under the board 2. The pulleys are rotatively mounted on shafts 18 supported on a bar 19. The latter has wheels 20 at the ends supported on rails 21 so that the bar 19 can be moved on the rails for cutting the rolls 5 with the upper portion of the knife blade, the bar being placed below the board 2. A motor 22 may be provided on the bar 19 for rotating the wheels 20 through gears 23, 20'. The wheels 20 are connected by gears 24 with the corresponding pulley 17, so that the pulley rotates when the bar 19 is moved, thereby causing the knife blade to move in a direction transverse to the direction of movement of the bar. Such movement of the knife facilitates the cutting operation.

After the rolls have been cut, the upper board 6 is raised with the upper halves of the rolls into a position indicated with dotted lines, the rolls being held by the needles or pins 8, as shown in dotted lines in Fig. 3. Slices or pieces of food or other food articles, such as frankfurters, are placed on the lower portions of the rolls. The upper board is then again lowered, bringing together the upper and lower portions of the rolls. It is evident that the upper portions will be placed in correct positions, exactly matching the lower portions, and clamping the food therebetween.

For removing the rolls from the pins 4 and 8, grids 25 and 26 are placed on the boards 2 and 6 between the pins. The upper and lower grids may be held together with the rolls therebetween by clamps 27 when it is desired to remove the completed sandwiches from the pins, the upper board being raised for lifting the grids. The upper grid 26 can be then removed and the lower grid 25 taken away with the sandwiches.

Articles of feed such as frankfurters 28 are cooked or heated on a tray 29 supported on arms 30' and legs 30 above a stove or heater 31. The legs are at one side of the tray only, so that the tray may be placed over an ordinary stove instead of using the special stove or heater 31. The tray has raised portions 32 supporting an upper plate 33. The latter has openings for various types of sausages, hamburgers, etc. The openings are larger than the sausages, so that the latter rest in the tray 29. The tray 29 and the plate 33 have registering holes 35 for admitting hot gases from the stove to a plate or grid 36 on which toast 37 or other articles of food may be placed for keeping them warm.

The knife blade cuts the rolls completely apart. For cutting the rolls at one side only, an additional set of knives is provided at the rear side of the machine. Disc knives 38 are used for this purpose rotatively mounted on arms 39 rigidly mounted on a cross-bar 39' slidably supported on rails 40. The knives have pulleys 41 connected by belts 42 with pulleys 43 on a common shaft 44 rotated by a motor 45. The arms 39 are so spaced that the knives cut the rolls at one side only to a desired depth, the rolls being positioned transversely of the board 2, as shown in Fig. 1. Places for the rolls may be marked on the board 2 in order to assure their correct positions. Low partitions 45' may be also provided for this purpose.

The knife blade 16 is also used for slicing various other food articles used for making sandwiches. The food articles 46, such as sausage, cheese, etc., are placed in tubular containers 47 supported on a bracket 48. The containers are open at the top and at the bottom, so that the food articles can rest on a table 49 placed in the path of the knife blade. The table is mounted on screws 50, so that its height can be adjusted for cutting slices of desired thickness from the food articles. The slices are pushed off the table by a bar 51. The bar 51 is engaged by hooks 55, 55', extending from the bar 19. The slices are moved by the bar 51 on the plate 49 to holes 57 through which the slices fall downward on a receiving tray 58. The edge of the tray is engaged by the spring pawl 59 on the bar 19, so that the tray is moved a certain distance with each passage of the knife, the slices being thereby laid out in rows on the tray 58. At the end of the travel of the knife blade when the bar 51 is moved to the other side of the knife blade, the hook 55 is disengaged by a cam 52, Fig. 5. On the return passage of the knife 16, the bar 51 is engaged by hooks 55', for shifting slices of food cut off by the knife blade on its return passage to holes 60, through which they fall into a receptacle 62. A cam 61 disengages the hooks 55'.

For supporting the food articles 46 in the containers 47 above the knife blade when it is not desired to use them, bars 63 are provided in the containers, hinged at 64 and moving in slots 65, Fig. 4. The bar can be moved into the middle position, forming a support for the particular food article 46.

A special device shown in Fig. 6 may be used for handling hot frankfurters or similar food articles. The device consists of a bottom plate 66 with hinges at the sides supporting an upper plate 67. A spring 68 tends to keep the rear ends of the device apart, the front ends being then drawn together. By pressing the rear ends together, the front ends can be opened for taking hold of a frankfurter 28. The upper plate has an opening 69, exposing the upper side of the frankfurter. A box 70 is mounted on the upper plate having a partition 71 in the middle. The lower compartment of the box is filled with mustard which can be squeezed on the exposed portion of the frankfurter through nozzles 72 by a plunger 73, operated by a handle 74. A spring 74' returns the handle to its original position after application of the mustard. The upper compartment may hold various spices, cold slaw, etc., pushed out by a plunger 75 with a handle 76 and spring 77. A knife 78 can be used to cut off a portion of the spice mass, which then falls on the frankfurter. The latter can be deposited on the lower half of a roll by opening the front ends of the device. The lower plate has an opening 79 through which mustard or spices can be deposited on slices of food if no frankfurter is held between the plates. Sharp points 80 are provided at the front ends for raising the upper half of a roll when the latter is not cut through but undercut at one side.

A modified machine is shown in Fig. 10, especially adapted for placing frankfurters and similar articles of food into rolls which have been partly cut. The bread rolls for this machine are undercut on a separate machine shown in Figs. 7, 8 and 9. The rolls are placed on a grid or wire mesh 85 having side walls, 86, the grid being placed in a box having a wall 87 and a bottom plate 88. The grid 85 is supported on lugs 89 at an elevation above the bottom. A second wall 90 is slidably mounted on rods 91 and is kept at a distance from the wall 87 by springs 92 on the rods. The rods have heads on the ends, limiting the movement of the wall 90. By moving the wall 90 against the wall 87, the roll is pressed against sharp pins 93 and will remain impaled on these pins when the second board is released.

The box with the rolls is placed on a base 94, Figs. 7 and 8, between guiding rails 95. The rolls are then pressed against the pins by a lever 96, Fig. 9, and are cut by a disc knife 97. The latter is rotatively supported on an arm 98 attached at the other end to a carriage 99 on rollers 100 moving on rails 101. An electric motor 102 is mounted on a carriage and is provided with a pulley 103 connected by a belt 104 with a pulley 105 on the disc knife. The knife is adjusted in its positon to cut the rolls in the middle and to a desired depth, i. e., either partly or completely.

Several such boxes are prepared with the rolls cut by the rotary knife, and they are placed side by side on the base 106 of the machine shown in Figs. 10 and 11 between guiding rails 107.

Frankfurters or other similar food articles are placed on a roasting grid or plate 108 hingedly mounted at 109 on a post 110. The plate extends over a stove 111, which may be of any ordinary type. The frankfurters are held by resilient clips 112 and 113, shown also in Fig. 12. The clips are so spaced that when the plate is turned over on its hinges into a position shown in Fig. 11, the ends of the clips register with the cuts in the rolls. Clips 112 press against the rolls as shown in Fig. 13, while clips 113 engage with their sharp prongs 114 the outer halves of the rolls. The frankfurters are then pushed downward by prongs of a suitable tool 115 through openings 116 in the plate, the openings being usually closed by hinged doors 117. The frankfurters, being pushed downward, move the clips apart, turning the free halves of the rolls outward and entering in the thereby formed places between the sides of the rolls.

A modified device for placing various food articles on bread, toast, rolls, etc., is shown in Fig. 14. It consists of a board 118 with a handle 119 at the rear and prongs 120 at the front, the prongs being used for holding food articles, slices, cuts, etc. A box 121 is supported on the board, having several compartments for mustard and various spices. The boxes have plungers for forcing the mustard, etc., through nozzles or openings 122 onto the food held by the prongs. The plungers are moved by pressing on rods 123, 124, etc. The food articles are removed from the prongs by hooks 125 on rods 126 extending to the rear of the board and having a button at the end. A spring 127 tends to keep the hooks withdrawn against the front edge of the board. The upper box is reserved for relishes, cole slaw, etc., and a knife 128 is provided for cutting off a portion of such relishes forced out of the box. A spring 129 keeps the knife in a raised position.

A modified machine is shown in Fig. 15. The box with the rolls is permanently mounted on a base 130. The rolls are undercut by a rotary knife 97, whereupon a roasting plate 131 with the frankfurter held by clips 112 and 113 is turned over on its hinge 109 and the frankfurter inserted into the slots in the rolls. The finished sandwiches are removed on a wire grid and new wire grid with new rolls is placed in the box.

A modified machine is shown in Fig. 17. The frankfurters are placed on a series of wire grids 132 hinged at 133 to a bar 134 supported on posts 135, the frankfurters being retained in their positions by wire clamps 112 and 113. The grids may be turned individually for depositing the frankfurters into the rolls 5 held in elongated boxes 136 similar to the already described boxes and having wire grids 85 with the side walls 86, shown separately in Fig. 16, these grids being used for removing finished sandwiches from the boxes. The rolls in the boxes are cut by a rotary knife 97 mounted on the arm 98 extending from a carriage 137 with a motor 97'. The latter can be moved toward the rolls on rails 138 for cutting the rolls. The carriage with the rails is movably supported on transverse rails 139, so that it can be moved transversely for successively cutting rolls in all the boxes in the machine.

The transverse rails can be omitted, however, in which case the boxes can be made removable and slidably supported on the base 140, so that a new box with the rolls can be moved into the positon for cutting upon removal of the box with the already cut rolls.

The same knife can be also used for cutting slices of food products, 141, 142, supported in open containers 143, Fig. 17, on a table 144. The food is moved against the knife by screws 143'.

The strips or grids 132 can slide over the supporting bars 134, so that when the last grid with the frankfurter is turned over the box with the cut rolls for placing the frankfurters into the openings in the rolls as described, the other grids 132 are advanced to the front, a new grid with fresh frankfurters being then placed in the rear.

The operation of the machine shown in Figs. 1 and 2 may be made automatic by providing suitable contact buttons or points, so that when the upper boards (or the board 9 only) are lowered, contacts are automatically closed for starting the motor 22. The knife 16 then begins to move on the pulleys 17. The rollers or wheels 20, 20', will also rotate, causing the knife to pass through the rolls. At the end of the travel of the knife, a new set of contacts is actuated, bringing the knife to a stop. The contacts may be switched over to operate the disc knives 38 instead of the band knife 16, if desired.

The knife in Fig. 7 may be made to move automatically by providing contact points at the arm 96 for starting the motor 102 when the rolls are clamped by the arm 96.

It should be noted that spacing of slices of food on the plate 58 may be made to correspond to the spacing of the rolls on the board 2. The plate 58 can be placed next to the board 2 and the slices moved at the same time onto the corresponding rolls.

It is understood that my machines for making sandwiches may be further modified without departing from the spirit of the invention, as set forth in the appended claims.

I claim as my invention:

1. A machine for making sandwiches comprising a base, a lower board on the base, a plurality of upwardly extending sharp-pointed elements on the board adapted to support bread rolls, an upper board movably supported above the lower board, a plurality of downward extending sharp-pointed elements on the upper board, the upper board being adapted to be moved against the lower board for clamping the rolls between the two boards, a knife blade between the boards, means to movably support the knife blade on the base, the knife being adapted to be moved for cutting the rolls in the middle, the upper portions of the rolls being adapted to remain impaled on the sharp-pointed elements of the upper board when the latter is raised for placing portions of food on the lower portions of the rolls to be covered by the upper roll portions when the upper board is again lowered, and means to remove the rolls from the boards.

2. A machine for making sandwiches comprising a base, a lower board on the base, a plurality of upwardly extending sharp-pointed elements on the board adapted to support bread rolls, an upper board movably supported above the lower board, a plurality of downward extending sharp-pointed elements on the upper board, the upper board being adapted to be moved against the lower board for clamping the rolls between the two boards, a knife blade between the boards, means to movably support the knife blade on the base, the knife being adapted to be moved for cutting the rolls in the middle, the upper portions of the rolls being adapted to remain impaled on the sharp-pointed elements of the upper board when the latter is raised for placing portions of food on the lower portions of the rolls to be covered by the upper roll portions when the upper board is again lowered, and upper and lower grids removably supported on the boards between the sharp-pointed elements, the grids being adapted to be held together, pressing the upper roll portions against the lower portions, for removing the rolls from the sharp-pointed elements when the upper board is raised.

3. A machine for making sandwiches comprising a base, a lower board on the base, a plurality of upwardly extending sharp-pointed elements on the board adapted to support bread rolls, an upper board movably supported above the lower board, a plurality of downward extending sharp-pointed elements on the upper board, the upper board being adapted to be moved against the lower board for clamping the rolls between the two boards, a knife blade between the boards, a bar supporting the knife, rollers at the ends of the bar, rails on the base supporting the rollers, the bar being adapted to be moved on the rails for cutting the rolls with the knife, the upper portions of the rolls being adapted to remain impaled on the sharp-pointed elements of the upper board when the latter is raised for placing portions of food on the lower portions of the rolls to be covered by the upper roll portions when the upper board is again lowered, and means to remove the rolls from the boards.

4. A machine for making sandwiches comprising a base, a lower board on the base, a plurality of upwardly extending sharp-pointed elements on the board adapted to support bread rolls, an upper board movably supported above the lower board, a plurality of downward extending sharp-pointed elements on the upper board, the upper board being adapted to be moved against the lower board for clamping the rolls between the two boards, a knife blade between the boards, a bar, rollers on the ends of the bar, rails supporting the rollers, pulleys rotatively mounted on the ends of the bar, an endless knife blade mounted on the pulleys and passing across the board, one portion of the blade passing under the board, the other portion of the blade passing above the board for cutting the rolls when the bar is moved on the rails, means to rotate the pulleys, thereby moving the knife blade transversely of the rails, upper portions of the rolls being adapted to remain impaled on the sharp-pointed elements of the upper board when the latter is raised for placing portions of food on the lower portions of the rolls to be covered by the upper roll portions when the upper board is again lowered, and means to remove the rolls from the boards.

5. A machine for making sandwiches comprising a base, a lower board supported on the base, a plurality of sharp-pointed elements on the base adapted to support bread rolls, an upper board hingedly supported on the base above the lower board, the upper board having a plurality of apertures, a second upper board movably supported above the first upper board, a plurality of sharp-pointed elements on the second upper board passing through the apertures and adapted to engage the upper portions of the rolls for holding the rolls in fixed positions, a knife blade movably supported at the side of the lower board adapted to cut the rolls, the upper board being adapted to be raised independently of the lower board when it is desired to undercut the rolls and to leave the undercut rolls on the lower board with both upper boards raised.

SAMUEL DEUTSCHER.